(12) United States Patent
Iizuka (10) Patent No.: US 6,264,333 B1
(45) Date of Patent: Jul. 24, 2001

(54) REFLECTION TYPE PROJECTOR

(75) Inventor: Takashi Iizuka, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/358,888

(22) Filed: Jul. 22, 1999

(30) Foreign Application Priority Data

Jul. 24, 1998 (JP) .................................................. 10-210052
Jul. 24, 1998 (JP) .................................................. 10-210053

(51) Int. Cl.$^7$ .................................................. G03B 21/28
(52) U.S. Cl. .............................. 353/101; 353/81; 353/98; 348/771
(58) Field of Search .................................. 353/81, 98, 33, 353/101, 100; 349/5; 348/742, 743, 771

(56) References Cited

U.S. PATENT DOCUMENTS

| | | |
|---|---|---|
| 5,231,433 | 7/1993 | Yoshida et al. . |
| 5,381,197 | 1/1995 | Yoshida et al. . |
| 5,839,808 | * 11/1998 | Koyama et al. ........................ 353/67 |
| 5,984,478 | * 11/1999 | Doany et al. ........................... 353/84 |
| 6,113,240 | * 9/2000 | Iizuka ..................................... 353/31 |
| 6,147,720 | * 11/2000 | Guerinot et al. ...................... 348/744 |

FOREIGN PATENT DOCUMENTS 5-27324  2/1993 (JP) .
10-82959 3/1998 (JP) .

* cited by examiner

Primary Examiner—William Dowling
(74) Attorney, Agent, or Firm—Greenblum & Bernstein, P.L.C.

(57) ABSTRACT

A reflection type projector includes a light source, a micro mirror device having many micromirrors two-dimensionally arranged, a separation prism and a projection lens. The separation prism is disposed between the light source and the micro mirror device. The separation prism is provided with a first surface on which the illumination light is incident, a second surface whose half part faces to the micro mirror device and the remaining half part is directed to the projection lens, and a third surface. The illumination light passes through the first and second surface to be incident on the micro mirror device. The reflected light from the micro mirror device is incident on the second surface. The separation prism is disposed so that the reflected light by the micromirrors at the ON position totally reflected by the first and third surface and the reflected light by the micromirrors at the OFF position is not totally reflected by the third surfaces. The light totally reflected by the first and third surfaces passes through the second surface to be incident on the projection lens that projects an image onto a screen.

12 Claims, 6 Drawing Sheets

REFLECTION TYPE PROJECTOR

BACKGROUND OF THE INVENTION

The present invention relates to a reflection type projector employing a reflection type light modulating device. The present invention also relates to a reflection type projector that is capable of adjusting a position of a projected image on a screen.

In general, an optical system of a projector includes a light source, a light modulating device and a projection lens.

As the light modulating device, a transmission type device and a reflection type device have been known.

The transmission type projector employs a transmission type modulating device such as a transmission type LCD panel. The microelement of the transmission type LCD panel is a cell that corresponds to a pixel of the projected image.

However, the transmission type projector has a problem in that the light efficiency, which is defined as a ratio of the maximum output light quantity from the modulating device to an incident light quantity onto the modulating device, is deteriorated as the resolution becomes higher in a constant device size. The transmission type modulating device must include opaque portions for arranging driving circuits. In particular, an active matrix type LCD such as a TFT (Thin Film Transistor) has a switching element such as a transistor for each cell. When the resolution becomes higher in a constant device size, the cell size becomes smaller, while the driving circuit can not be reduced as the same ratio as that of the cell. And accordingly, the ratio of the opaque area increases, which deteriorates the light efficiency.

One solution to increase the resolution without deteriorating the light efficiency is to employ the reflection type light modulating device such as a reflection type LCD panel or a DMD™ (Digital Micromirror Devices™). Since the driving circuits can be arranged on the backside of the reflection surface in the reflection type light modulating device, it is free from deterioration of the light efficiency due to increase of the resolution.

The DMD™ has a large number of micromirrors that are two-dimensionally arranged. The angular position of each micromirror is independently switched between an ON position and an OFF position. The micromirror is a microelement that corresponds to a pixel of the projected image. In the reflection type projector employing the DMD™, the light reflected by the micromirrors at the ON position should be separated from the light reflected by the micromirrors at the OFF positions. That is, only the light reflected by the micromirrors at the ON positions should be directed to the projection lens.

Figure 6:
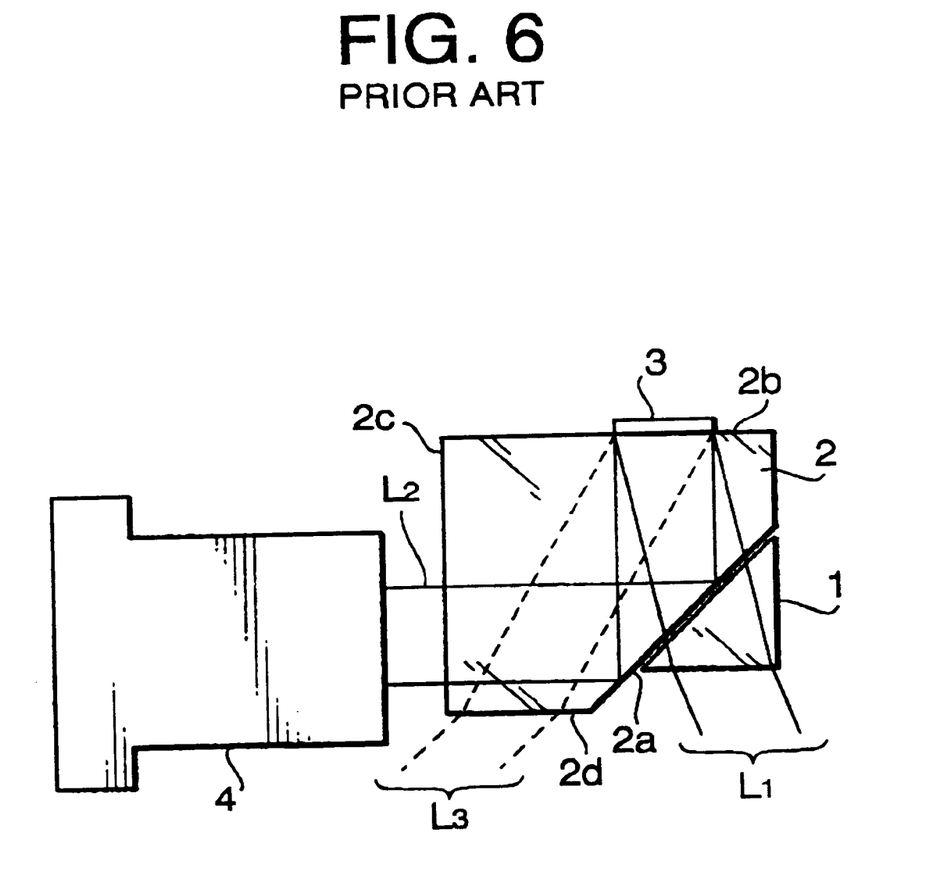
FIG. 6 shows a main portion of a conventional projector using a DMD™.

Japanese Patent Provisional Publication No. HEI 10-82959 discloses a reflection type projector that employs the DMD™. The disclosed projector is, as schematically shown in FIG. 6, provided with a pair of prisms 1 and 2. Illumination light L1 passes through the first prism 1 and is incident on a first surface 2a of the second prism 2. The illumination light L1 exits from a second surface 2b, and then is reflected by the DMD™ 3. Projective light L2 (solid line), which is reflected by the micromirrors at the ON position, is totally reflected by the first surface 2a of the second prism 2 and exits from a third surface 2c to form an image on a screen through a projection lens 4. Non-projective light L3 (dotted line), which is reflected by the micromirrors at the OFF position, exits from a fourth surface 2d of the second prism 2 and is not incident on the projection lens 4.

Since the second prism 2 is designed such that the projective light L2 is reflected by the first surface 2a and the non-projective light L3 passes the fourth surface 2d, these lights L2 and L3 must be spatially separated. Namely, the projective light L2 must not reach the fourth surface 2d and the non-projective light L3 must not reach the first surface 2a. This design requires the long distance from the DMD™ 3 to the surfaces 2a and 2d, which increases the size of the second prism 2, disturbing a compact design of the projector. Further, the larger distance from the DMD™ 3 to the projection lens 4 requires long back focus with short focal length for the projection lens 4. This restricts freedom of the lens design.

From an another viewpoint, there is a requirement to adjust a position of the projected image on the screen.

Japanese Patent Provisional Publication No. HEI 5-27324 discloses an LCD projector that is capable of adjusting a position of a projected image on a screen. The disclosed LCD projector includes a transmission type LCD panel through which parallel illumination light from a light source is transmitted, a condenser lens and a projection lens. The illumination light is modulated by the LCD panel and projected onto the screen through the condenser lens and the projection lens.

The condenser lens and the projection lens are mounted on an adjusting mechanism so that the lenses are moved, as one unit, in a direction perpendicular to the optical axis. By moving the lenses by the adjusting mechanism, the position of the projection area is shifted on the screen without changing a position of the main body of the projector, and without distortion of the projected image.

The disclosed projector is, however, the transmission type projector and has a disadvantage of the lower light efficiency described above.

In order to separate light paths, in the reflection type light modulating device, an inclined arrangement of the optical elements is required. That is, light paths of an illumination light that is incident on the reflection type light modulating device and a reflected light from the device should be made different from each other. If the adjusting mechanism as disclosed in the publication is employed in the reflection type projector, and the positions of the projection lens and the condenser lens are changed, the reflected light from the reflection type light modulating device is not efficiently incident on the projection lens and accordingly the luminance may be lowered in the projected image and/or part of the projected image may be lost. Accordingly, the adjusting mechanism disclosed in the publication is not applicable to the projector employing the reflection type light modulating device.

SUMMARY OF THE INVENTION

It is therefore an object of the present invention to provide an improved reflection type projector that employs a micro mirror device and a prism, which is capable of decreasing the size of the prism to achieve a compact design of the projector.

Further, an another object of the present invention is to provide an improved reflection type projector that employs a reflection type light modulating device, which is capable of shifting a position of a projected image on a screen without lowering the luminance of the projected image.

For the first object, according to an aspect of the present invention, there is provided the reflection type projector, which includes a light source, a micro mirror device such as a DMD™, a separation prism and a projection lens. The separation prism is disposed between the light source and the micro mirror device. The separation prism is provided with a first surface on which the illumination light is incident, a second surface whose one part faces to the micro mirror device and the other part is directed to the projection lens, and a third surface. The illumination light passes through the first and second surface to be incident on the micro mirror device. The reflected light from the micro mirror device is incident on the second surface. The separation prism is disposed so that the reflected light from the micromirrors at the ON position is totally reflected by the first and third surfaces and the reflected light from the micromirrors at the OFF position is not totally reflected by the third surfaces.

With this construction, the illumination light is incident on the first surface and reflected by the micro mirror device through the second surface. Projective light, which is reflected by the micromirrors at the ON position, is totally reflected by the first and third surfaces and exits from the second surface to be incident on the projection lens. The projection lens projects the light onto a screen to form an image. On the other hand, non-projective light, which is reflected by the micromirrors at the OFF position, is incident on the third surface. A part of the non-projective light is totally reflected by the first surface to be incident on the third surface, the remaining part of the non-projective light is directly incident on the third surface. Anyway, since an incident angle of the non-projective light on the third surface is smaller than a critical angle, it passes the third surface.

The projective light and the non-projective light are separated by using the total reflection of the third surface, which allows to arrange the first and third surfaces in the position where the projective light and the non-projective light are not spatially separated. Accordingly, the distance from the micro mirror device to the first and third surfaces can be reduced, decreasing the size of the separation prism.

The micro mirror device may face to a half part of the second surface. In such a case, the remaining half part is directed to the projection lens.

The first and third surfaces are preferably at right angles to each other. Namely, the separation prism may be a right angle prism. In this case, the second surface may be perpendicular to the optical axis of the projection lens and it may intersect the first and second surfaces at 45 degrees.

Further, the projector may include an adjusting mechanism for adjusting the position of the projection lens along a direction perpendicular to the optical axis thereof. In this case, the projection lens is preferably telecentric to the micro mirror device.

Still further, the projector may include a auxiliary prism that faces to the first surface at a predetermined spacing. The auxiliary prism enables to compensate an influence of the wavelength shift of the light source.

For the second object, according to another aspect of the present invention, there is provided the reflection type projector, which includes a light source, a reflection type light modulating device, a projection lens, a reflector that reflects the illumination light to be incident on the modulating device through the projection lens, a first adjusting mechanism for adjusting the position of said modulating device and a second adjusting mechanism for rotating the reflector. The reflector is disposed at an aperture position of the projection lens on one side with respect to the optical axis. The second adjusting mechanism changes direction of the reflected light from the reflector such that the reflecting light is incident on the modulating device.

With this construction, the position of the projected image on the screen may be changed by adjusting the first adjusting mechanism. And then, the second adjusting mechanism changes the angle of the reflector so that the reflected light from the reflector follows the shift of the modulating device.

The light source may be located at the same side of the modulating device with respect to the projection lens. In this case, the illumination light passes the projection lens and is reflected by the reflector to pass the projection lens.

Alternatively, the light source may be located so that the illumination light is directly incident on the reflector without passing the projection lens. In such a case, the illumination light is incident on the reflector along a direction that intersects the optical axis of the projection lens.

DESCRIPTION OF THE EMBODIMENT

Embodiments of the present invention will be described hereinafter.

[First Embodiment]

Figure 1:
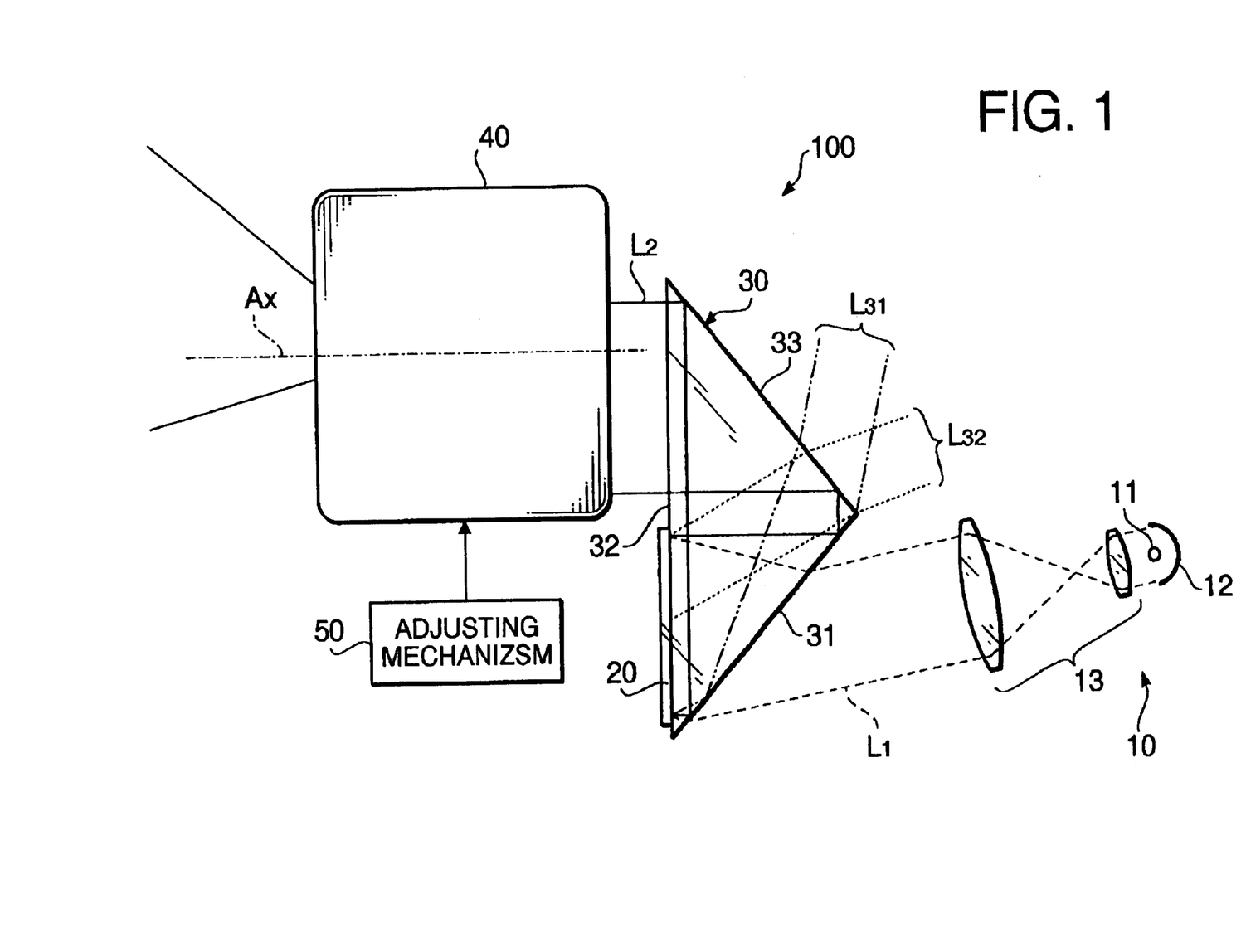
FIG. 1 shows a basic arrangement of the optical system of a reflection type projector according to a first embodiment.

FIG. 1 shows a reflection type projector according to the first embodiment.

The optical system of the reflection type projector 100 according to the first embodiment is, as shown in FIG. 1, provided with a light source 10 for emitting illumination light, a DMD™ 20 for modulating the illumination light according to image information, a separation prism 30 that is disposed between the light source 10 and the DMD™ 20, and a projection lens 40 for projecting the reflected light from the DMD™ 20 onto a screen.

The light source 10 includes a high luminance lamp 11 such as a Xenon lamp, a halogen lamp, a metal halide lamp or a ultra-high pressure mercury lamp, a concave mirror 12 that converts a non-directional light emitted from the high luminance lamp 11 into a parallel light directed to the separation prism 30 and a beam expander 13 that expands a diameter of the light beam.

The DMD™ 20, which is a micro mirror device, has many micromirrors that are two-dimensionally arranged. The angular position of each micromirror can be independently switched between an ON position and an OFF position. When the parallel light beam is incident on the DMD™ 20 at the incident angle of 20 degrees with respect to a macroscopic light receiving surface of the DMD™ 20, a direction of projective light that is defined as light reflected by the micromirrors located at the ON positions is perpendicular to the macroscopic light receiving surface. It should be noted that, a single flat plane formed by all the micromirrors is defined as the macroscopic light receiving surface. Non-projective light that is defined as light reflected by the micromirrors located at the OFF position is reflected in a direction different from the reflected direction of the projective light.

The separation prism 30 is a Porro prism that is provided with a pair of shorter surfaces forming right angles therebetween, and a longer surface that intersects the shorter surfaces at 45 degrees. The separation prism 30 is arranged such that the longer surface faces both the DMD™ 20 and the projection lens 40. One of the shorter surfaces is referred to as a first surface 31, on which the illumination light is incident. The longer surface is referred to as a second surface 32, half area of which faces the DMD™ 20 and the remaining half area faces the projection lens 40. The second surface 32 is perpendicular to the optical axis Ax of the projection lens 40. The other shorter surface of the separation prism 30 is referred to as a third surface 33.

The light source 10 is arranged such that the illumination light L1, which is incident on the first surface 31 and passes through the separation prism 30, is incident on the macroscopic light receiving surface of the DMD™ 20 at the incident angle of 20 degrees.

With the above-described arrangement, the projective light (solid line) L2 reflected by the micromirrors located at the ON positions is incident on the second surface 32 at right angles. The incident angle of the projective light L2 with respect to the first surface 31 is 45 degrees. If the refractive index of the separation prism 30 is 1.5, the critical angle is approximately 42 degrees. Thus, the projective light L2 is totally reflected by the first surface (inside the separation prism 30) and is directed to the third surface 33. The incident angle of the projective light L2 with respect to the third surface 33 is also 45 degrees, and therefore the projective light L2 is totally reflected also by the third surface 33 and exits from the second surface 32 perpendicularly.

The non-projective lights (dotted line) L31 and L32 that are reflected by the micromirrors located at the OFF positions are incident on the first and third surfaces 31 and 33. Specifically, part of the non-projective light L31 is totally reflected by the first surface 31 and is incident on the third surface 33, and the remaining part of the non-projective light L32 is directly incident on the third surface 33. The incident angles of the non-projective light L31 and L32 with respect to the third surface 33 are smaller than the critical angle, and accordingly, the non-projective light L31 and L32 exit from the third surface 33. Since the first and third surfaces 31 and 33 are perpendicular to each other, if the incident angle of the light L31 on the third surface 33 is represented as θ, the incident angle of the light L32 on the third surface is equal to −θ. The absolute values of the incident angles of the lights L31 and L32 are the same.

The incident angle of the projective light L2 onto the third surface 33 is larger than the critical angle, and the absolute value of the incident angles of the non-projective lights L31 and L32 onto the third surface 33 are smaller than the critical angle. Since the difference of the incident angles on the third surface 33 separates the projective light from the non-projective light, the first and third surfaces 31 and 33 can be arranged at the positions where the projective light and the non-projective light are not spatially separated. This reduces the distance from the DMD™ to the first and third surfaces 31 and 33, and reduces the size of the separation prism 30. Further, the distance between the DMD™ 20 and the projection lens 40 can be reduced, which increases freedom in designing the projection lens 40.

An example of the projection lens 40 is disclosed in U.S. Pat. No. 4,913,540, teachings of which are incorporated herein by reference. It should be noted that the lens system disclosed therein is referred to is only an example, and any suitable lens system can be used as the projection lens 40.

The position of the projection lens 40 is adjustable along a direction perpendicular to the optical axis Ax thereof by an adjusting mechanism 50. The adjusting mechanism 50 may include a well-known mechanism such as a combination of a fixed nut and a motor-driven screw rod. By shifting the projection lens 40, the projected image can be moved on the screen. Consequently, even if the projector 100 must be located at a decentered position with respect to the center of the screen, the center of the projected image can be made coincident with the center of the screen by driving the adjusting mechanism 50.

Further, the projection lens 40 is telecentric to the DMD™ 20 so that the projective light L2 is incident on a pupil of the projection lens 40 in spite of the position of the projection lens 40. The presence of the prism 30 allows that the light source 10 is arranged at the opposite side of the projection lens 40, which avoids interference between the illumination light path to the DMD™ 20 and the reflected light path from the DMD™ 20 due to the adjustment of the projection lens 40.

Figure 2A:
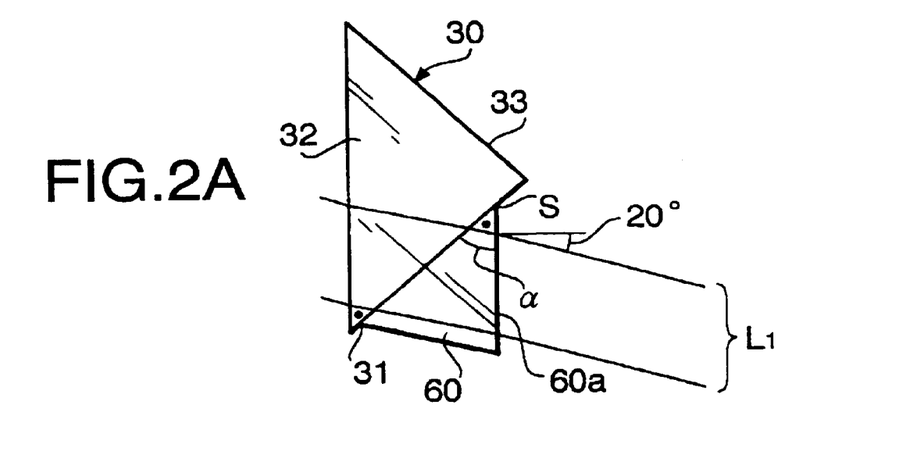
FIGS. 2A, 2B and 2C show variations of auxiliary prism applied to the first embodiment.
Figure 2B:
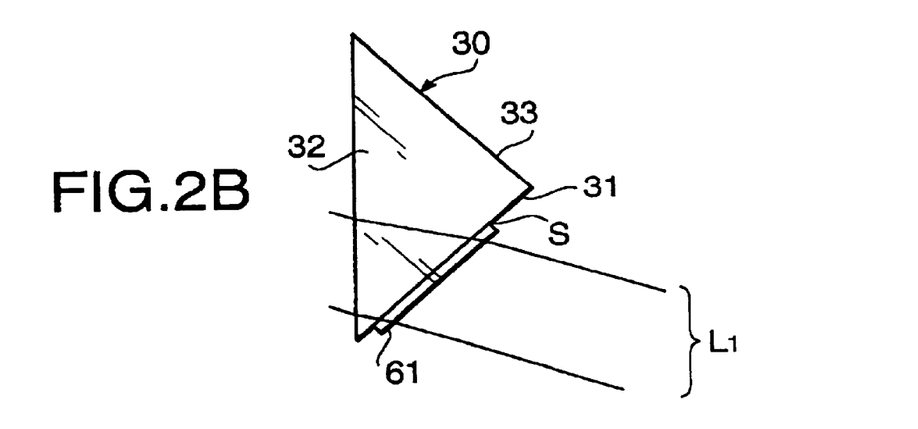
Figure 2C:
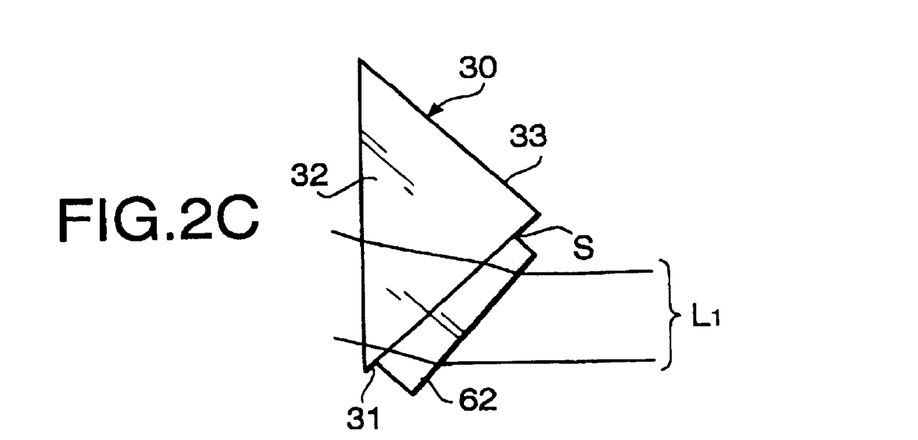

FIGS. 2A, 2B and 2C show auxiliary prisms that compensate an influence of dispersion of the separation prism 30. Since a prism has dispersion and the light source has a wide wavelength range of emission, the single use of the prism as shown in FIG. 1 causes the incident angle of the illumination light L1 on the DMD™ 20 to have a wide angle range. If the range of the incident angle becomes larger than the predetermined permission level, the expanse of the direction of the projected light cannot be ignored. The auxiliary prism offsets the dispersion of the separation prism 30 (i.e., the auxiliary prism compensates the expanse of the direction of the projected light due to the wide wavelength range of emission).

In FIG. 2A, an auxiliary prism 60 faces the first surface 31 of the separation prism 30 with a predetermined spacing S therebetween. The auxiliary prism 60 is made from the same material as the separation prism 30. Namely, these prisms have the same refractive index and the same dispersion (Abbe number). The vertical angle α is 45 degrees, and therefore, the incident surface 60a of the auxiliary prism 60 and the second surface 32 of the separating prism 30 are parallel to each other. The light source (not shown) is arranged such that the illumination light L1 is incident on the incident surface 60a at 20 degrees.

The combination of the separation prism 30 and the auxiliary prism 60 reduces the expanse of the incident angle on the DMD™ 20 due to the wide emission wavelength range of the light source 10, because the prisms 30 and 60 are equivalent to a plane parallel plate for the illumination light L1. The spacing S between the prisms enables the total reflection of the projective light reflected from the DMD™ 20 on the first surface 31.

FIG. 2B shows a modification of the optical system in FIG. 2A. An auxiliary prism 61 faces the first surface 31 of the separation prism 30 with a predetermined spacing S therebetween. The auxiliary prism 61 has a shape of a plane parallel plate in a macroscopic view, and a large number of steps having inclined surfaces are formed microscopically on one surface of the prism 61. Namely, the auxiliary prism 61 is like a "Fresnel prism". A Fresnel lens has concentric steps, while the auxiliary prism 61 has parallel steps. The optical function of the auxiliary prism 61 is identical to that of the auxiliary prism 60 in FIG. 2A. And therefore, the light source is arranged such that the illumination light L1 is incident on the auxiliary prism 61 from the same direction as FIG. 2A.

FIG. 2C shows an another modification of the optical system in FIG. 2A. In FIG. 2C, an auxiliary prism 62 faces the first surface 31 of the separation prism 30 with a predetermined spacing S therebetween. An apex angle of the auxiliary prism 62 is determined so that the illumination light L1 is incident on the prism 62 in a direction perpendicular to the second surface 32 of the separation prism 30. That is, the primary object of the auxiliary prism 62 is a free arrangement of the light source. Since the apex angle of the auxiliary prism 62 is smaller than 45 degrees, it does not completely compensate the expanse of the incident angle on the DMD™ 20 due to the dispersion of the separation prism 30. However, the auxiliary prism 62 achieves its primary object with reducing the expanse of the incident angle as compared with a case having no auxiliary prism.

Second Embodiment

Figure 3:
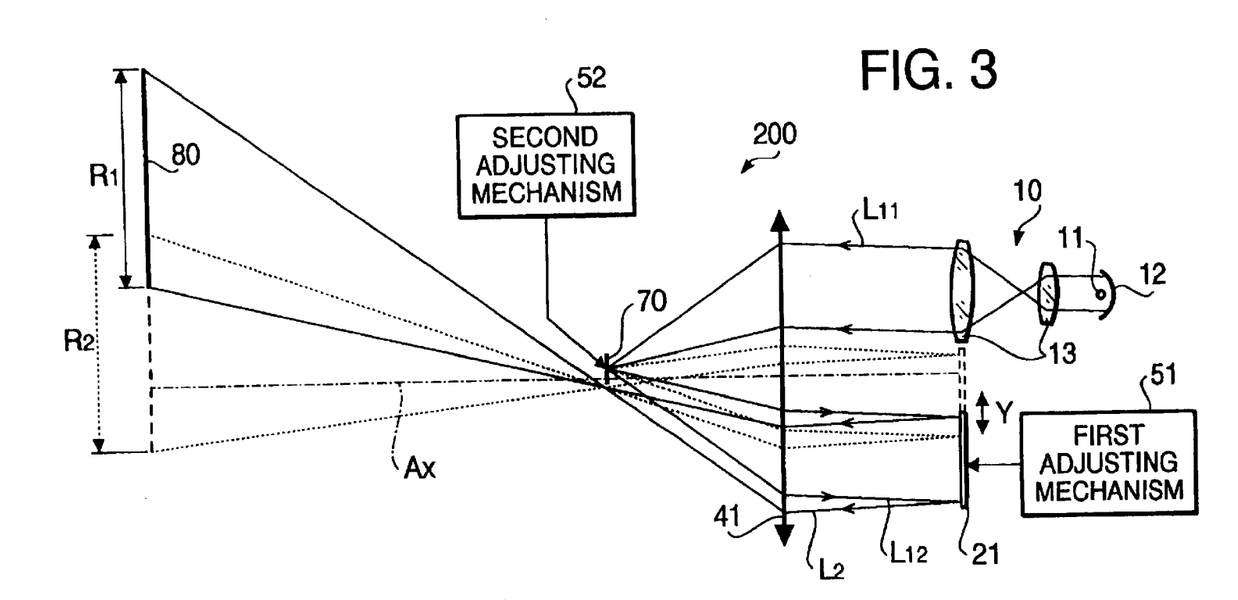
FIG. 3 shows a basic arrangement of the optical system of a reflection type projector according to a second embodiment.
Figure 3A:
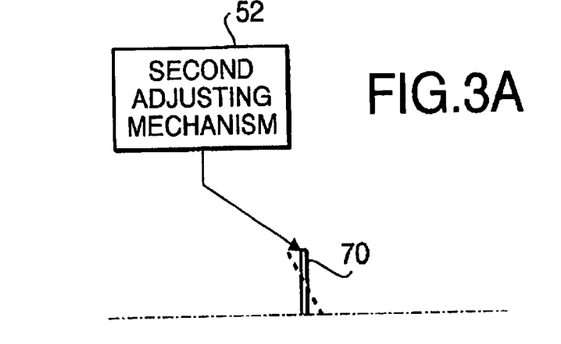
FIG. 3A is a diagram showing rotational positions of a mirror employed in the optical system shown in FIG. 3.
Figure 4:
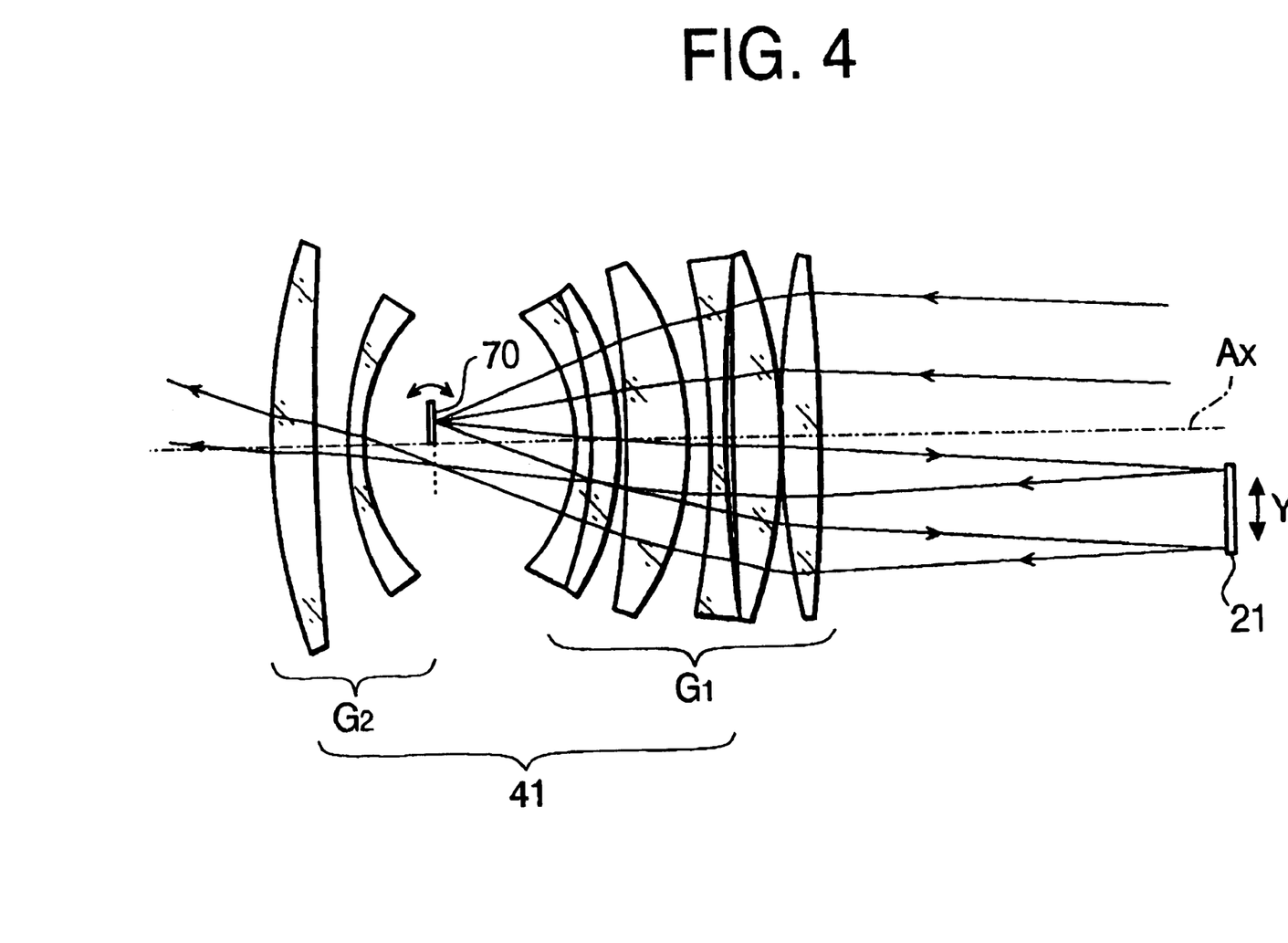
FIG. 4 is a specific diagram of the projection lens included in the projector of the second embodiment.

FIGS. 3, 3A and 4 show a reflection type projector 200 according to the second embodiment of the present invention: FIG. 3 shows a basic arrangement; FIG. 3A shows rotational positions of a reflector 70 employed in the projector 200; and FIG. 4 show a specific construction of a projection lens.

The reflection type projector 200 according to the second embodiment is provided with a light source 10, a reflection type light modulating device 21 for modulating the illumination light according to image information, a projection lens 41 for projecting a reflected light from the modulating device 21 onto a screen 80, and a reflector 70 that reflects the illumination light to be incident on the modulating device 21 through the projection lens 41.

With this construction, the illumination light L11 emitted from the light source 10 is converged by the projection lens to be incident on the reflector 70, the reflected light L12 from the reflector 70 passes through the projection lens 41 to be incident on the modulating device 21. The projection lens 41 projects the modulated and reflected light L2 onto the screen 80.

The projection lens 41 is a telecentric lens whose pupil on the modulating device side is at infinity. The reflector 70 is disposed at an aperture position of the projection lens 41. The reflector is located on upper side with respect to an optical axis Ax of the projection lens 41.

The light source 10 has the same construction as that of the first embodiment. That is, the light source 10 includes a lamp 11, a concave mirror 12 and a beam expander 13. An illumination light L11 from the light source 10 is a parallel beam and is slightly inclined such that the optical path thereof is farther from the optical axis Ax at a position closer to the projection lens 41. Then, by the projection lens 41, the illumination light L11 is converged on the reflector 70, which is located at the upper side with respect to the optical axis Ax. The illumination light L12 reflected by the reflector 70 is converted into a parallel beam by the projection lens 41. The light L12 is parallel to the light L11 that is directed to the projection lens 41 from the light source 10. That is, the illumination light L12 is slightly inclined in the upper direction in FIG. 3.

The reflection type modulating device 21 is a reflection type LCD panel in the second embodiment. The incident surface of the modulating device 21 is perpendicular to the optical axis Ax. Since the incident angle and the reflection angle are identical to each other, the reflected light L2 from the modulating device 21 is slightly inclined in outer (lower) direction. The optical path of the reflected light L2 is farther from the optical axis Ax at a position closer to the projection lens 41. The reflected light L2 that is parallel beam is converged at the aperture position on the lower side with respect to the optical axis Ax where the reflector 70 is not located. Accordingly, the reflected light L2 passes through the lower side of the reflector 70 to be projected onto the screen 80. Namely, the illumination light L11 and the reflected light L2 are separated at the position of the aperture.

Further, since the modulating device 21 and the screen 80 are perpendicular to the optical axis Ax, the decentering arrangement of the modulating device 21 does not cause distortion of the projected image.

As described above, the reflection type light modulating device 21 is a reflection type LCD panel in the second embodiment. However, another type of the light modulating device such as the DMD™ may be used instead. Since the driving circuits are arranged on the back side of the reflection surface in the reflection type light modulating device 21, the light efficiency is not deteriorated even if the resolution is increased. Accordingly, the light efficiency becomes larger than the conventional projector using a transmission type light modulating device at the same element size and the same resolution.

The reflection type projector 200 is provided with a first adjusting mechanism 51 and a second adjusting mechanism 52. The first adjusting mechanism 51 adjusts the position of the modulating device 21 along a Y direction that is perpendicular to the optical axis Ax to move the projected image on the screen 80 in the Y direction. The second adjusting mechanism 52 adjusts the angle of the reflector 70. As schematically shown in FIG. 3A, the reflector is rotatable about a rotation axis that is perpendicular to the sheet of FIG. 3. The second adjusting mechanism 52 rotates the reflector 70 so that the illumination light L12 from the reflector 70 follows the shift of the modulating device 21.

By moving the modulating device 21 in the Y direction, the projected image can be moved on the screen 80. However, if only the modulating device 21 is moved, the illumination light L12 from the reflector 70 may not sufficiently incident on the modulating device 21. Enlargement of the illumination area enables that the illumination light L12 is incident on the modulating device 21, while it lowers the luminance in the projected image. Therefore, the second adjusting mechanism 52 adjusts the angle of the reflector 70 so that the illumination light L12 is efficiently incident on the modulating device 21 in spite of the position thereof.

The adjusting mechanisms 51 and 52 enable shift of the projected image without lowering the luminance thereof. For instance, when the modulating device 21 is located at the position indicated by the solid line in FIG. 3, the reflector 70 is positioned such that a reflection surface thereof is perpendicular to the optical axis Ax. The reflected light L2 proceeds along the solid line to form the image in a projection area R1 on the screen 80. Then, when the first adjusting mechanism 51 moves the modulating device 21 to the position indicated by the dotted line, the second adjusting mechanism 52 rotates the reflector 70 in counterclockwise direction as shown by the dotted line in FIG. 3A. The reflected light L2 proceeds along the dotted line to form the image in a projection area R2 that is a lower position with respect to the area R1 in FIG. 3.

In general, a modulating device and a screen are perpendicular to an optical axis of a projection lens so as not to distort a projected image on the screen. When the projector looks up or looks down the screen, the modulating device is decentered with respect to the optical axis of the projection lens. In such a construction, the projected light from the modulating device only passes on one side of the projection lens with respect to the optical axis. The other side of the projection lens is not used for projection. The optical system of the second embodiment uses the free space of the projection lens for transmitting the illumination light.

FIG. 4 is a specific diagram of the projection lens 41 of the second embodiment. The projection lens 41 consists of a first lens group G1 that includes six lenses and a second lens group G2 that includes two lenses. The first lens group G1 is located on the side of the modulating device 21, the second lens group G2 is located on the side of the screen. The aperture is positioned between the lens groups G1 and G2, and the reflector 70 is disposed at the aperture position.

Third Embodiment

Figure 5:
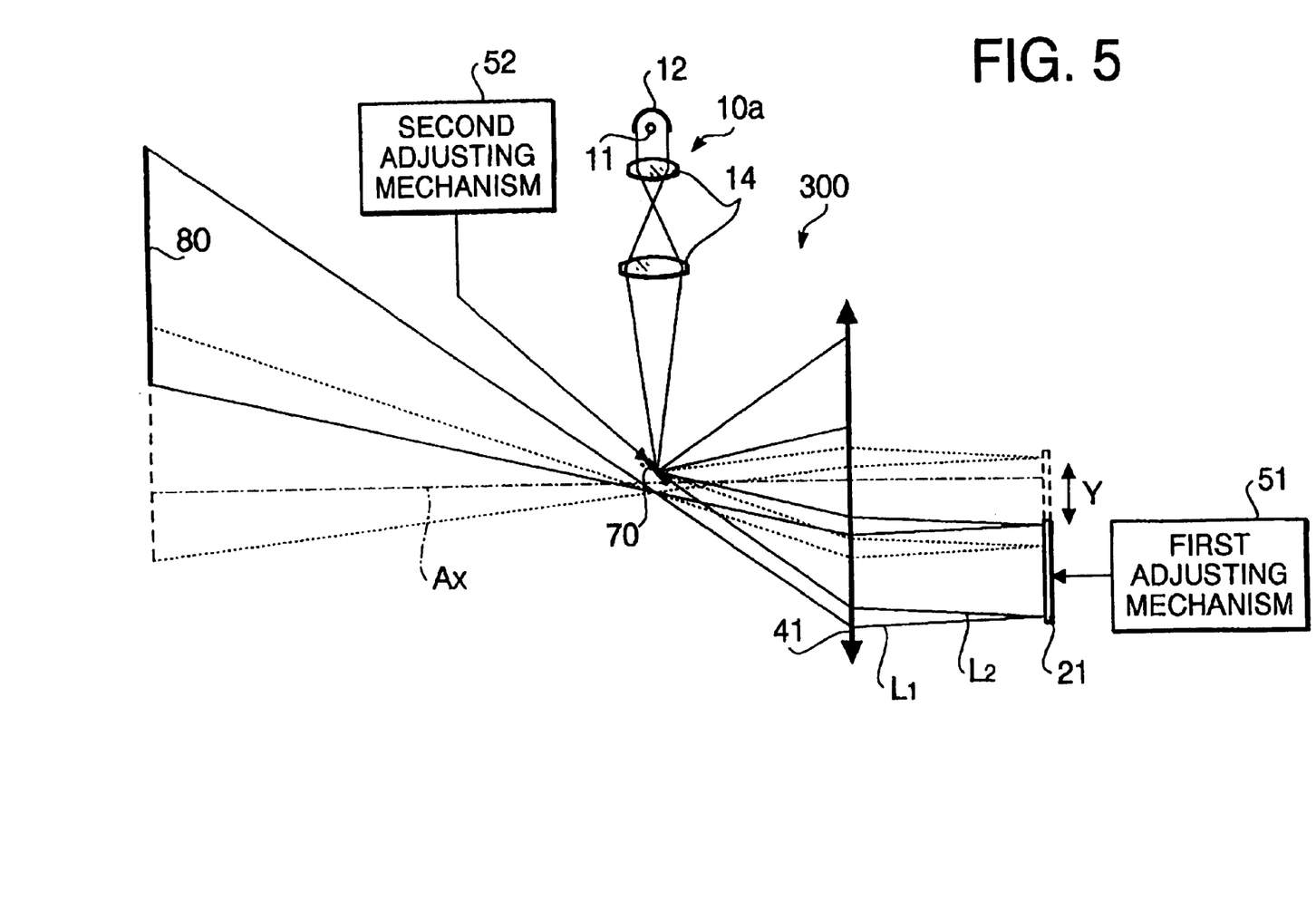
FIG. 5 shows a basic arrangement of the optical system of a reflection type projector according to a third embodiment.

FIG. 5 shows a basic arrangement of an optical system of a reflection type projector 300 according to a third embodiment. In the projector 200 of the second embodiment, the light source 10 and the modulating device 21 are located side by side, which may disturbs the movement of the modulating device 21 in order to avoid interference with the light source 10.

Accordingly, in the projector 300 of the third embodiment, the light source 10a is located so that the illumination light L1 is directly incident on the reflector 70 without passing the projection lens 41. The illumination light from the light source 10 is incident on the reflector 70 along a direction that intersects the optical axis Ax of the projection lens 41.

In the third embodiment, the basic construction except the arrangement of the light source 10a is identical to the second embodiment. The light source 10a has the similar construction to the first embodiment. That is, the light source 10a includes a lamp 11, a concave mirror 12. Further, the light source 10a includes a condenser lens 14.

The illumination light from the light source 10 is converged on the reflector 70 that is disposed at the aperture position on one side (upper side) with respect to the optical axis Ax. The illumination light reflected by the reflector 70 passes through the projection lens 41 and is converted into a parallel beam. The illumination light L1 is incident on the modulating device 21. The reflected light L2 from the modulating device 21 is also parallel beam, and it is converged by the projection lens 41 at the aperture position on the lower side with respect to the optical axis Ax where the reflector 70 is not located. Accordingly, the reflected light L2 passes through the lower side of the reflector 70 and is projected onto the screen 80.

The projector 300 is also provided with the first and second adjusting mechanisms 51 and 52 similarly to the second embodiment. When the modulating device 21 is located at the position indicated by the solid line in FIG. 5 and the reflector 70 is positioned at the angle indicated by the solid line, the reflected light L2 progresses along the solid line to form the image on the screen 80. Then, when the first adjusting mechanism 51 moves the modulating device 21 to the position indicated by the dotted line, the second adjusting mechanism 52 rotates the reflector 70 in counter-clockwise direction as shown by the dotted line. The reflected light L2 proceeds along the dotted line to shift the image in the lower direction in FIG. 5.

With the construction of the third embodiment, since the modulating device 21 is free from interference with the light source 10a, the adjustable range of the modulating device 21 becomes larger than the second embodiment, which increases the freedom of the image projection area on the screen 80.

The present disclosure relates to the subject matter contained in Japanese Patent Applications No. HEI 10-210052 and No. HEI 10-210053, both filed on Jul. 24, 1998, which are expressly incorporated herein by reference in their entireties.

What is claimed is:

1. A reflection type projector, comprising:
   a light source for emitting illumination light;
   a micro mirror device having many micromirrors that are two-dimensionally arranged, each of said many micromirrors being independently switched between an ON position and an OFF position to modulate said illumination light;
   a separation prism disposed between said light source and said micro mirror device, said separation prism being provided with first, second and third surfaces, wherein said illumination light is incident on said first surface and reflected by said micro mirror device that faces to one part of said second surface, said separation prism being disposed so that the reflected light from said micromirrors at the ON position is totally reflected by said first and third surfaces to exit from said separation prism through the other part of said second surface and the reflected light from said micromirrors at the OFF position is not totally reflected by said third surface; and
   a projection lens for projecting the light that is totally reflected by said first and third surfaces and passes through said second surface onto a screen.

2. The reflection type projector according to claim 1, wherein said first surface is at right angles to said third surface.

3. The reflection type projector according to claim 1, wherein said second surface is almost orthogonal to the optical axis of said projection lens and said second surface intersects said first and third surfaces at 45 degrees.

4. The reflection type projector according to claim 1, wherein said separation prism comprises a right angle prism whose shorter surfaces are said first and third surfaces and a longer surface is said second surface.

5. The reflection type projector according to claim 1, wherein said projection lens is telecentric to said micro mirror device, and further comprising an adjusting mechanism for adjusting the position of said projection lens along a direction perpendicular to an optical axis of said projection lens.

6. The reflection type projector according to claim 1, further comprising an auxiliary prism that faces to said first surface at a predetermined spacing.

7. A reflection type projector, comprising:
   a light source for emitting illumination light;
   a micro mirror device having many micromirrors that are two-dimensionally arranged, said each micromirror being independently switched between an ON position and an OFF position to modulate said illumination light;
   a separation prism disposed between said light source and said micro mirror device, said separation prism being provided with first and second surfaces, wherein said illumination light is incident on said first surface and reflected by said micro mirror device that faces to said second surface, said separation prism being disposed so that the reflected light from said micromirrors at the ON position is totally reflected by said first surface;
   a projection lens for projecting the light that is totally reflected by said first surface onto a screen; and an adjusting mechanism for adjusting the position of said projection lens along a direction perpendicular to the optical axis of said projection lens.

8. The reflection type projector according to claim 7, wherein said separation prism comprises a right angle prism.

9. The reflection type projector according to claim 7, further comprising an auxiliary prism that faces to said first surface at a predetermined spacing.

10. A reflection type projector, comprising:

a light source for emitting illumination light;

a reflection type light modulating device for modulating said illumination light according to image information;

a projection lens for projecting the reflected light from said modulating device onto a screen, said projection lens being telecentric to said modulating device;

a reflector disposed at an aperture position of said projection lens on one side with respect to an optical axis of said projection lens, wherein said reflector reflects said illumination light to be incident on said modulating device through said projection lens;

a first adjusting mechanism for adjusting the position of said modulating device along a direction perpendicular to said optical axis; and a second adjusting mechanism for rotating said reflector to change direction of the reflected light from said reflector such that the reflecting light is incident on said modulating device.

11. The reflection type projector according to claim 10, wherein said light source is located at the same side of said modulating device with respect to said projection lens, and wherein said illumination light passes said projection lens to be incident on said reflector and reflected light from said reflector passes said projection lens to be incident on said modulating device.

12. The reflection type projector according to claim 10, wherein said light source is located such that the illumination light is directly incident on said reflector without passing said projection lens.

* * * * *